Patented Oct. 31, 1950

2,527,861

UNITED STATES PATENT OFFICE 2,527,861

MONO ALKYL SULFAMIDES

Henry A. Walter, Longmeadow, Mass., assignor to Monsanto Chemical Company, St. Louis, Mo., a corporation of Delaware No Drawing. Application May 7, 1948, Serial No. 25,791

3 Claims. (Cl. 260—551)

This invention relates to new chemical compounds. More particularly, the invention relates to mono-substituted sulfamides.

An object of this invention is to provide new chemical compounds.

A further object is to provide mono-substituted sulfamides.

These and other objects are attained by reacting sulfamide with a primary amine in aqueous solution.

The following examples are given in illustration and are not intended as limitations on the scope of this invention. Where parts are mentioned, they are parts by weight.

Example I 100 parts of sulfamide and 76 parts of mono n-butyl amine were dissolved in 100 parts of water. The solution was refluxed at atmospheric pressure for about 3 hours. Excess water was removed by evaporation and the reaction product was purified by crystallization from ethanol. The crystals, on analysis, proved to be mono n-butyl sulfamide. The crystals had a melting point of 26° C.

Example II 100 parts of sulfamide and 118 parts of n-heptylamine were dissolved in 250 parts of water. The solution was refluxed at atmospheric pressure for about five hours. On cooling the reaction vessel the reaction product crystallized and was purified by recrystallization from ethanol. The crystals were analysed and found to be mono n-heptyl sulfamide. The crystals had a melting point of 69° C.

The monoalkyl sulfamides are new compounds which can be made by the direct interaction between sulfamide and primary amines. In order to confine the reaction to the production of the mono derivatives of sulfamide, the amount of primary amine should be restricted to about one mol per mol of sulfamide. Any primary amine may be used including methyl, ethyl, propyl, isopropyl, n-butyl, isobutyl, amyl, heptyl, octyl, decyl, cyclohexyl amines, aniline, alpha-naphthylamine, beta-naphthylamine, etc.

The reaction is carried out in aqueous solution at reflux temperature at atmospheric pressure. The duration of the reaction depends somewhat on the reactivity of the amine but will run anywhere from 1 to 6 or more hours.

The lower alkyl sulfamides are partially soluble in water and can be best recovered therefrom by crystallization from alcohol-water media. The higher alkyl, aryl and cyclic derivatives of sulfamide are sufficiently insoluble in water to be obtained directly from the reaction medium by crystallization.

The compounds of this invention may be considered to have the following formula $RNH-SO_2-NH_2$ wherein R may be alkyl, aryl, aralkyl, cycloalkyl.

The new compounds are useful as plasticizers for aminoplasts such as melamine resins, urea resins, thiourea resins, dicyandiamide resins and especially the polyamide resins known as Nylon. Their relatively high melting points are particularly favorable for use as plasticizers in aminoplasts since, as a result of their high melting point, they are relatively non-volatile at the elevated temperatures needed for curing the aminoplasts. In addition, when used as plasticizers with aminoplasts, the substituted sulfamides may partially be reacted with the resin in the curing step thus assuring permanency of plasticizing action and preventing migration of the plasticizer.

It is obvious that many variations may be made in the products and processes of this invention without departing from the spirit and scope thereof as defined in the appended claims.

What is claimed is:

1. A process for preparing mono-substituted sulfamides which consists essentially of reacting 1 mol of sulfamide with about 1 mol of a primary alkyl amine in aqueous solution at reflux temperature and atmospheric pressure for from 1 to 6 hours.

2. A process as in claim 1 wherein the primary alkyl amine is n-butylamine.

3. A process as in claim 1 wherein the primary alkyl amine is n-heptylamine.

HENRY A. WALTER.

REFERENCES CITED

The following references are of record in the file of this patent:

UNITED STATES PATENTS

| Number | Name | Date |
|---|---|---|
| 2,079,541 | Battegay | May 4, 1937 |
| 2,323,789 | Bond | July 6, 1943 |

FOREIGN PATENTS

| Number | Country | Date |
|---|---|---|
| 823,925 | France | Oct. 25, 1937 |
| 673,389 | Germany | Mar. 24, 1939 |

OTHER REFERENCES

Behrend, "Liebigs Annalen," vol. 222 (1883), pages 118, 119, 125, 126 and 127.

Franchimont, "Rec. Trav. Chim. Pays Bas," vol. 3 (1884), page 418.

Wood, "Nature," vol. 136 (1935), page 837.